(12) United States Patent
Inuzuka

(10) Patent No.: US 10,784,729 B2
(45) Date of Patent: Sep. 22, 2020

(54) POWER TOOL

(71) Applicant: MAKITA CORPORATION, Anjo-shi, Aichi-ken (JP)

(72) Inventor: Junya Inuzuka, Anjo (JP)

(73) Assignee: MAKITA CORPORATION, Anjo (JP)

( * ) Notice: Subject to any disclaimer, the term of this patent is extended or adjusted under 35 U.S.C. 154(b) by 154 days.

(21) Appl. No.: 15/963,568

(22) Filed: Apr. 26, 2018

(65) Prior Publication Data

US 2018/0358854 A1 Dec. 13, 2018

(30) Foreign Application Priority Data

Jun. 12, 2017 (JP) .................................. 2017-115323

(51) Int. Cl.
| | |
|---|---|
| *H02K 1/27* | (2006.01) |
| *H02K 9/06* | (2006.01) |
| *B25D 11/12* | (2006.01) |
| *B25D 16/00* | (2006.01) |
| *B25F 5/02* | (2006.01) |
| *H02K 1/30* | (2006.01) |
| *H02K 7/14* | (2006.01) |

(52) U.S. Cl.
CPC ............. *H02K 1/276* (2013.01); *B25D 11/12* (2013.01); *B25D 16/00* (2013.01); *B25F 5/02* (2013.01); *H02K 1/30* (2013.01); *H02K 7/145* (2013.01); *H02K 9/06* (2013.01); *B25D 2211/068* (2013.01); *B25D 2250/121* (2013.01); *B25D 2250/221* (2013.01); *B25D 2250/265* (2013.01)

(58) Field of Classification Search
CPC ............. H02K 1/27; H02K 1/276; H02K 9/06; H02K 1/30; H02K 7/145
USPC .................................. 310/156.01–156.84, 43
See application file for complete search history.

(56) References Cited

U.S. PATENT DOCUMENTS

| | | | | |
|---|---|---|---|---|
| 2005/0140235 | A1* | 6/2005 | Yamagishi | ............. H02K 1/276 310/156.53 |
| 2006/0273679 | A1* | 12/2006 | Iwase | ..................... H02K 1/276 310/156.53 |
| 2007/0205686 | A1* | 9/2007 | Ishida | ..................... H02K 1/276 310/156.21 |
| 2008/0224558 | A1* | 9/2008 | Ionel | ..................... H02K 1/276 310/156.57 |
| 2009/0033172 | A1* | 2/2009 | Igawa | ..................... H01R 43/12 310/248 |
| 2010/0026127 | A1* | 2/2010 | Mizutani | .............. H02K 1/2766 310/156.53 |
| 2014/0042861 | A1* | 2/2014 | Kawaji | .................. H02K 1/276 310/156.53 |
| 2015/0069864 | A1 | 3/2015 | Nagahama et al. | |
| 2015/0280500 | A1* | 10/2015 | Nigo | ..................... H02K 21/16 310/156.53 |

FOREIGN PATENT DOCUMENTS

JP 2015-056953 A 3/2015

* cited by examiner

*Primary Examiner* — Terrance L Kenerly
(74) *Attorney, Agent, or Firm* — Oliff PLC

(57) ABSTRACT

A rotor has reduced weight. A hammer drill includes a motor including a stator and a rotor rotatable relative to the stator. The rotor includes a rotor core having a first space, and a permanent magnet fixed on the rotor core.

11 Claims, 5 Drawing Sheets

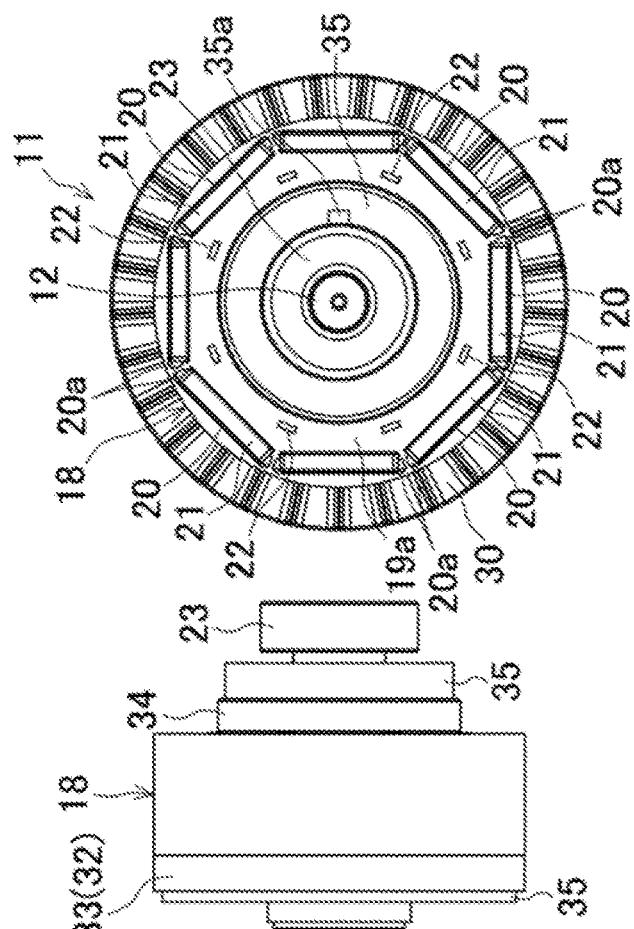
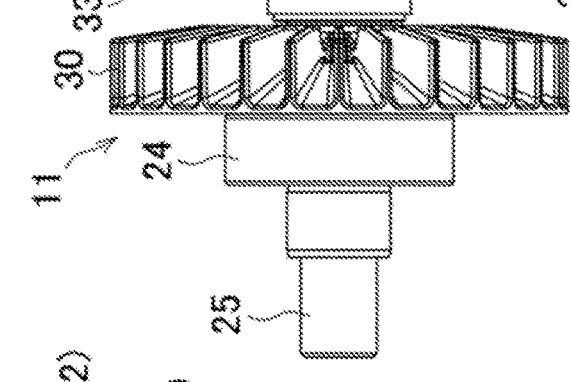
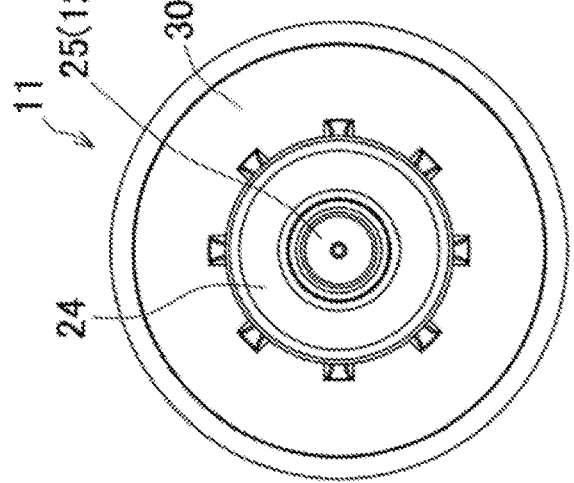

POWER TOOL

CROSS-REFERENCE TO RELATED APPLICATIONS

This application claims the benefit of priority to Japanese Patent Application No. 2017-115323, filed on Jun. 12, 2017, the entire contents of which are hereby incorporated by reference.

BACKGROUND

1. Technical Field

The present invention relates to a power tool such as a hammer drill.

2. Description of the Background

A motor for driving a power tool includes a stator and a rotor rotatable relative to the stator as described in, for example, Japanese Unexamined Patent Application Publication No. 2015-56953. The rotor includes a rotational shaft aligned with its axis, a cylindrical rotor core formed from a multilayered electromagnetic steel plate and surrounding the rotational shaft, and permanent magnets contained in the rotor core.

BRIEF SUMMARY

In manufacturing a rotor, permanent magnets may be fixed onto a rotor core with an adhesive. The adhesive may run down or contract to cause ununiform bonded surfaces of the permanent magnets with the rotor core. When the rotor rotates, the centrifugal force applied through the adhesive can concentrate on part of the rotor core. The rotor core can break easily.

Another known method uses a resin instead of an adhesive for integrating a rotational shaft, a rotor core, and permanent magnets. The resin is poured under pressure to achieve uniform bonded surfaces of the permanent magnets with the rotor core and increase the strength of the rotor. The resin between the rotational shaft and the rotor core also provides additional insulation.

However, a rotor core with lightening holes can have such resin entering the holes, and may not be lightened sufficiently.

One or more aspects of the present invention are directed to reducing the weight of a rotor for a power tool.

A power tool according to a first aspect includes
a motor including
  a stator, and
  a rotor rotatable relative to the stator, the rotor including
    a rotor core having a first space, and
    a permanent magnet fixed on the rotor core.

A power tool according to a second aspect includes
a motor including
  a stator, and
  a rotor rotatable relative to the stator, the rotor including
    a rotational shaft having a second space,
    a rotor core, and
    a permanent magnet fixed on the rotor core.

A power tool according to a third aspect includes
a motor including,
  a stator, and
  a rotor rotatable relative to the stator, the rotor including
    a rotational shaft,
    a rotor core,
    a permanent magnet fixed on the rotor core, and
    an intermediate member having a smaller specific gravity than iron located between the rotational shaft and the rotor core, the intermediate member having a third space.

The above aspects reduce the weight of the rotor for a power tool.

BRIEF DESCRIPTION OF DRAWINGS

FIG. 2A is a front view of a rotor, FIG. 2B is a side view of the rotor, and FIG. 2C is a rear view of the rotor.

DETAILED DESCRIPTION

Embodiments will now be described with reference to the drawings.

Figure 1:
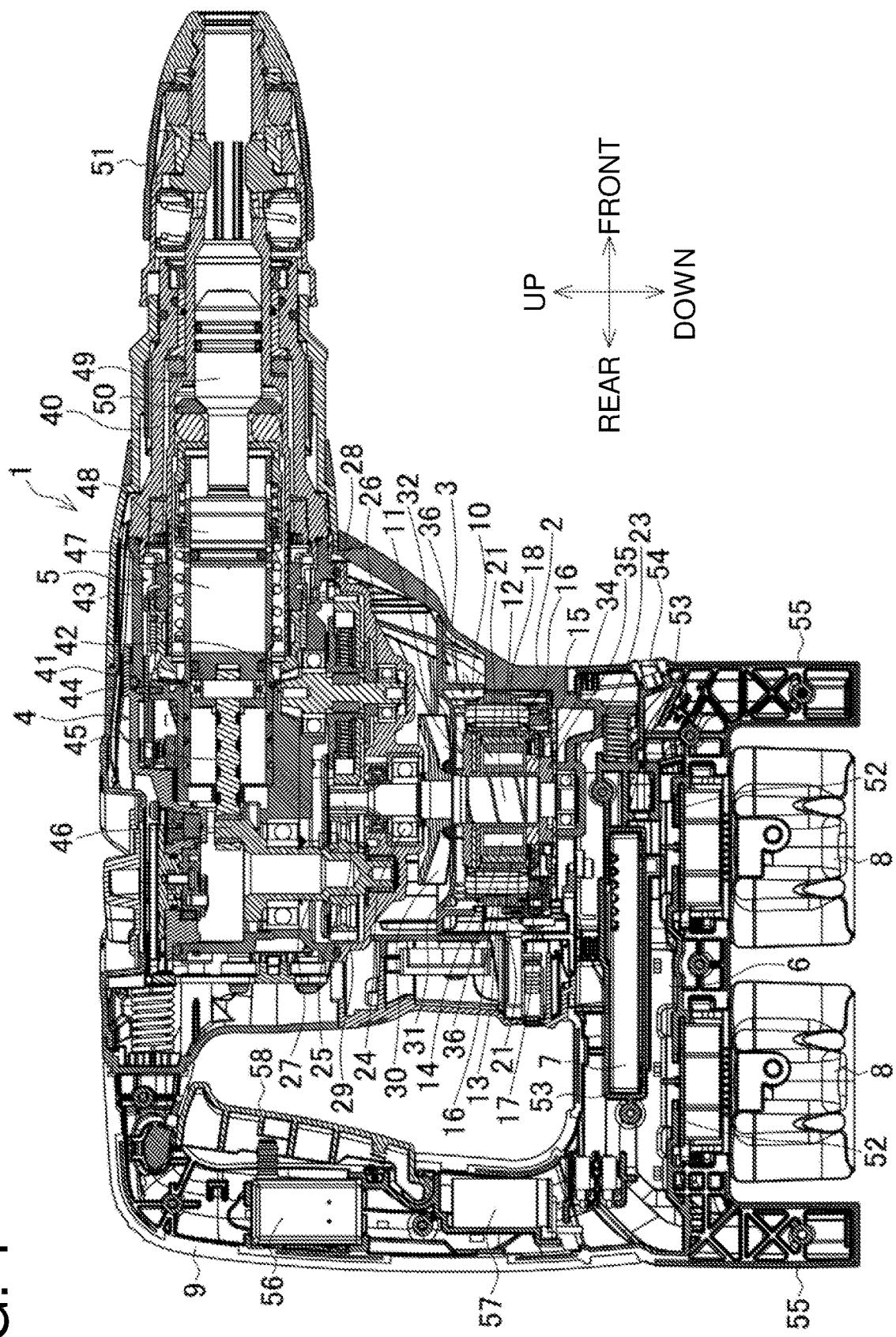
FIG. 1 is a longitudinal sectional view of a hammer drill.

FIG. 1 is a longitudinal sectional view of a hammer drill as an example of a power tool. The hammer drill 1 includes a motor housing 2 and an output housing 4. The motor housing 2, which extends vertically in the figure, contains a brushless motor 3. The output housing 4, which is located above the motor housing 2, extends frontward in the figure and contains an output unit 5. The motor housing 2 contains a controller 7 in its lower part, and a battery holder 6 for holding two battery packs 8 below the controller 7. The hammer drill 1 further includes a handle 9, which vertically extends behind the output housing 4 laterally across the battery holder 6.

The brushless motor 3 is an inner-rotor motor including a stator 10 and a rotor 11 contained in the stator 10. The brushless motor 3 is contained in the motor housing 2 with a rotational shaft 12 of the rotor 11 facing upward.

The stator 10 includes a stator core 13, an upper insulator 14, a lower insulator 15, and multiple coils 16. The upper insulator 14 is arranged above the stator core 13. The lower insulator 15 is arranged below the stator core 13. The multiple coils 16 are wound at the upper and lower insulators 14 and 15 inside the stator core 13. The lower insulator 15 has its lower end holding a sensor circuit board 17, on which a rotation detecting element (not shown) is mounted for detecting the positions of permanent magnets 21 included in the rotor core 18 (described later) and outputting a rotation detection signal.

As shown in FIGS. 2A to 3B, the rotor 11 includes the rotational shaft 12, a cylindrical rotor core 18, and multiple permanent magnets 21. The rotational shaft 12 is aligned with its axis. The rotor core 18 includes a multilayered electromagnetic steel plate 19 surrounding the rotational shaft 12. The permanent magnets 21 are fit in through-holes 20, which are located concentrically inside the rotor core 18. The through-holes 20 are longer than the permanent magnets 21. Each through-hole 20 has, on its circumferential two ends, excess spaces 20a extending circumferentially from the two ends of the corresponding permanent magnet 21.

The electromagnetic steel plate 19 includes swaged parts 22 located concentrically inward from the through-holes 20 between circumferentially adjacent through-holes 20.

The rotational shaft 12 has its lower end supported by a bearing 23 on the bottom of the motor housing 2, and its upper end supported by a bearing 24 in the output housing 4 and protruding into the output housing 4. A pinion 25 on the upper end of the rotational shaft 12 meshes with a gear 28 in a countershaft 26 and with a gear 29 in a crankshaft 27. The rotational shaft 12 includes a centrifugal fan 30 below the bearing 24. A baffle 31 is arranged below the centrifugal fan 30 in the motor housing 2.

Figure 3A:
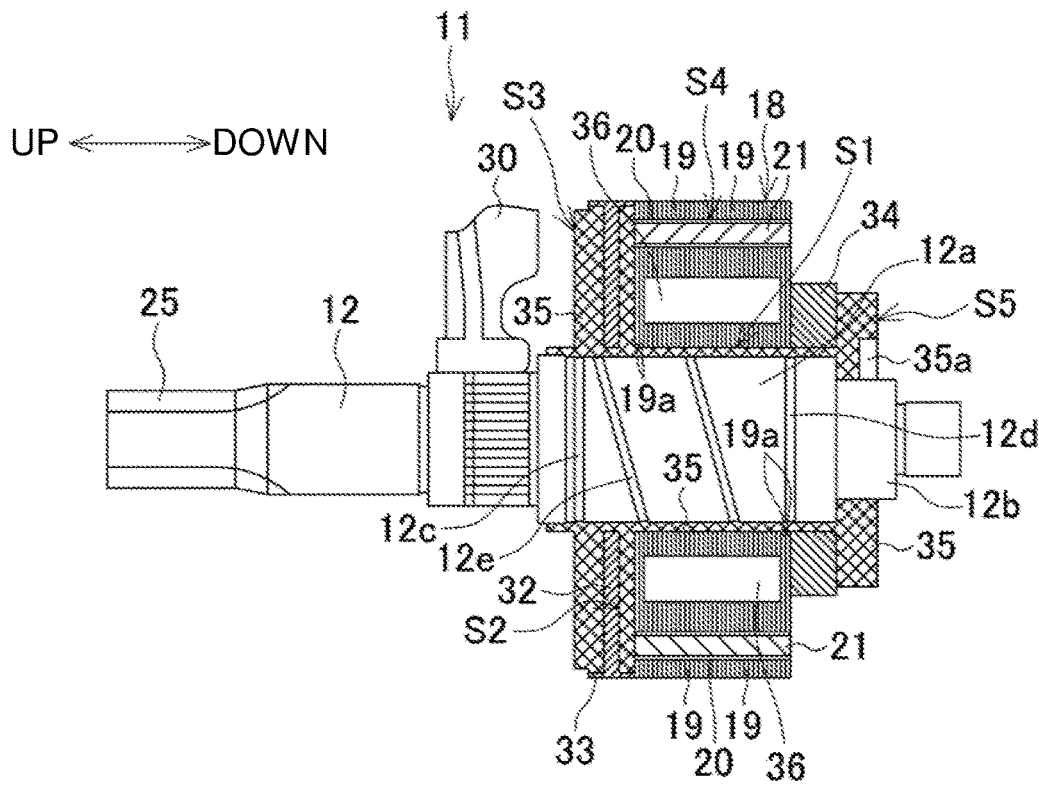
FIG. 3A is a longitudinal sectional view of the rotor.
Figure 3B:
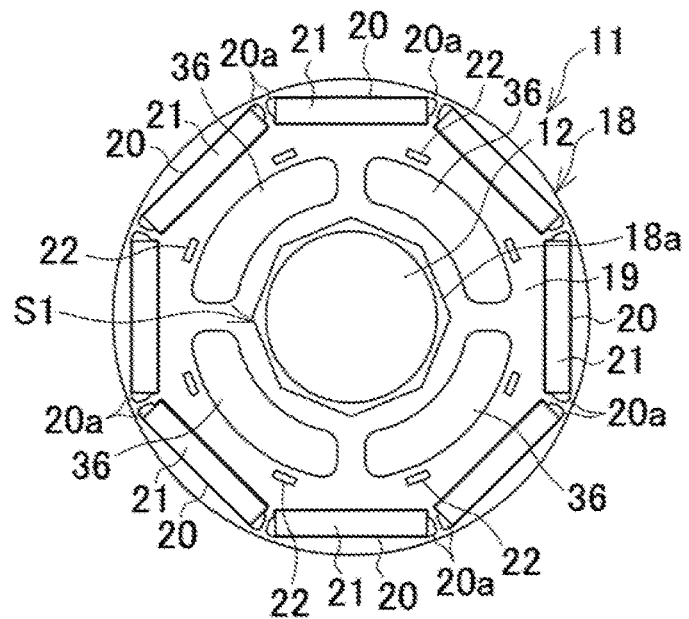
FIG. 3B is a lateral sectional view of the rotor.

A disk-shaped upper sleeve 32 with the same diameter as the rotor core 18 is located between the rotor core 18 and the centrifugal fan 30. The upper sleeve 32 has a short cylindrical part 33 along its outer periphery, which is axially longer than its central part. The short cylindrical part 33 has its lower end in contact with the upper end of the rotor core 18 to define a space between the upper sleeve 32 and the rotor core 18 for receiving resin injection in front and at the rear of the upper sleeve 32. The short cylindrical part 33 protrudes upward and downward from the central part by the same length. Either oriented upward or downward, the upper sleeve 32 can be attached to the rotational shaft 12. The upper sleeve 32 has a central hole with substantially the same inner diameter as the central hole of the rotor core 18. The central hole 18a of the rotor core 18 is not circular but is octagonal in cross section as shown in FIG. 3B.

A lower sleeve 34 having a smaller diameter than the rotor core 18 and having its outer circumference inward from the permanent magnets 21 is located between the rotor core 18 and the bearing 23. The lower sleeve 34 is in contact with the lower end of the rotor core 18. The upper and lower sleeves 32 and 34 are made of brass. The upper sleeve 32 prevents the permanent magnets 21 from slipping off. The lower sleeve 34 is used for adjusting a balance by machining its outer surface.

The rotor 11 is integrated with a resin. As shown in FIG. 3A, a mold has a cylindrical space S1 defined by the rotor core 18 and the upper and lower sleeves 32 and 34 around a middle part 12a with a largest diameter in the rotational shaft 12. A disk-shaped space S2 communicating with the cylindrical space S1 is defined between the upper sleeve 32 and the rotor core 18. A disk-shaped space S3 communicating with the cylindrical space S1 is defined above the upper sleeve 32. Each through-hole 20 has a clearance S4 from the permanent magnet 21. The clearance S4 communicates with the excess space 20a and the disk-shaped space S2. A disk-shaped space S5 communicating with the cylindrical space S1 is defined around a lower end 12b with a smallest diameter below the lower sleeve 34. The spaces S1 to S5 in the mold are filled with a resin 35 poured from the space S5 to the space S1, from the space S1 to the space S2 and the space S3, and from the space S2 to the clearance S4 to integrate the rotational shaft 12, the rotor core 18, the permanent magnets 21, and the upper and lower sleeves 32 and 34. The octagonal central hole 18a prevents the rotational shaft 12 from slipping when integrated with the rotor core 18 with the resin 35 poured in the cylindrical space S1. The peripheral surface of the middle part 12a, which receives the resin 35, has an annular upper groove 12c, an annular lower groove 12d, and a spiral groove 12e connecting the upper groove 12c and the lower groove 12d. This firmly integrates the rotational shaft 12 with the resin 35.

In FIGS. 2A to 3B, the resin 35 has a recess 35a in its lower surface around the lower end 12b of the rotational shaft 12. The recess 35a is detected using a laser beam to detect rotation in adjusting a balance. The lower end 12b has a smaller diameter than the middle part 12a. However, the lower end portion of the resin 35 with the recess 35a vertically overlaps the rotor core 18 and the lower sleeve 34, and prevents the rotational shaft 12 from slipping off under a force that pulls the rotational shaft 12 upward.

As shown in FIGS. 3A and 3B, the rotor core 18 has four arc-shaped lightening holes (first spaces) 36, which are concentric about the axis of the rotor core 18 and located inward from the through-holes 20. The lightening holes 36 can define continuous spaces along the axis in the electromagnetic steel plates 19 with through-holes of the same shape. In FIGS. 3A and 3B, the rotor core 18 has its two ends in the axial direction including two electromagnetic steel plates 19a without through-holes. Each lightening hole 36 thus has closed ends. This prevents the resin 35 from entering the lightening holes 36 when the rotor 11 is integrated.

The output unit 5 includes a rotatable cylindrical tool holder 40 extending in the front-rear direction. The tool holder 40 holds an external bevel gear 41 on its rear end, which meshes with a bevel gear 42 on an upper end of the countershaft 26. The tool holder 40 receives a cylinder 43. The cylinder 43 includes a piston 44 connected to a crankpin 46 at an eccentric position on the upper end of the crankshaft 27 with the connecting rod 45.

The cylinder 43 contains a reciprocating striker 48 in front of the piston 44 across an air chamber 47. The tool holder 40 contains a reciprocating impact bolt 49 in front of the striker 48. A tip tool, such as a drill bit, is fit in the tool holder 40 from the distal end of the tool holder 40. The tip tool pushes back the impact bolt 49 at its rear end until the impact bolt 49 comes in contact with a receptacle ring 50 in front of the cylinder 43, causing the rear end of the impact bolt 49 to protrude into the cylinder 43. An operation sleeve 51, which is externally held on the front end of the tool holder 40, allows attachment and removal of the tip tool to and from the tool holder 40.

The battery holder 6 contains two terminal mounts 52 in the front-rear direction. Each terminal mount 52 holds the battery pack 8 slidably mountable in the lateral direction. The controller 7 is located above the terminal mounts 52. The controller 7 includes a control circuit board on which a microcomputer and switching elements (not shown) are mounted. The controller 7 is supported in the front-rear direction by U-ribs 53 vertically extending on the inner surface of the battery holder 6. A light 54 is located in front of the controller 7 to illuminate the front of the output unit 5 with a light emitting diode (LED). The battery holder 6 has front and rear protection plates 55 protruding downward to cover the front and rear of the mounted battery packs 8.

The handle 9 contains a switch 56 and a capacitor 57, which are electrically connected to the controller 7. The switch 56 has a plunger protruding frontward. The switch 56 includes a switch lever 58.

When the switch lever 58 is pressed by a hand holding the handle 9 to turn on the switch 56, the brushless motor 3 is powered by the battery packs 8 to rotate the rotational shaft 12. More specifically, the microcomputer in the controller 7 receives, from the rotation detection element in the sensor circuit board 17, a rotation detection signal indicating the positions of the permanent magnets 21 in the rotor 11, and determines the rotational state of the rotor 11. The microcomputer controls the on-off state of each switching element in accordance with the determined rotational state, and applies a current through the coils 16 in the stator 10 sequentially to rotate the rotor 11.

The rotation of the rotational shaft 12 causes the countershaft 26 to rotate at a lower speed through the gear 28, which then rotates the tool holder 40 together with the tip tool through the bevel gears 41 and 42. The rotation of the rotational shaft 12 also causes the crankshaft 27 to rotate at a lower speed through the gear 29, which then reciprocates the piston 44 within the cylinder 43 through the connecting rod 45 and thus reciprocates the striker 48 across the air chamber 47. The striker 48 then strikes the tip tool with the impact bolt 49.

The battery holder 6 has inlets (not shown) on its lateral two side surfaces of the controller 7. The motor housing 2 has outlets (not shown) on its lateral two side surfaces of the centrifugal fan 30. The controller 7 is located between the inlets and the brushless motor 3. When the centrifugal fan 30 rotates in accordance with the rotation of the rotational shaft 12, air is drawn through the inlets and comes in contact with the controller 7 to cool the controller 7, passes through the motor housing 2 to cool the brushless motor 3, and then exits through the outlets after flowing along the baffle 31.

The hammer drill 1 according to the present embodiment includes the rotor 11 having the rotor core 18 with spaces (lightening holes 36) to reduce the weight of the rotor 11.

More specifically, the spaces (lightening holes 36) are closed, and then the rotational shaft 12, the rotor core 18, and the permanent magnets 21 are integrated together with the resin 35. This structure prevents the lightening holes 36 from being filled with the resin 35 when the rotational shaft 12, the rotor core 18, and the permanent magnets 21 are fixed with the resin 35.

The lightening holes 36 can have the two ends easily closed with the electromagnetic steel plates 19a.

The lightening holes may not have arc-shaped cross sections. The lightening holes may have circular, triangular, or polygonal cross sections. The integration of the rotor with the resin may be eliminated. The rotor may simply include the rotor core with lightening holes to reduce weight.

Figure 4A:
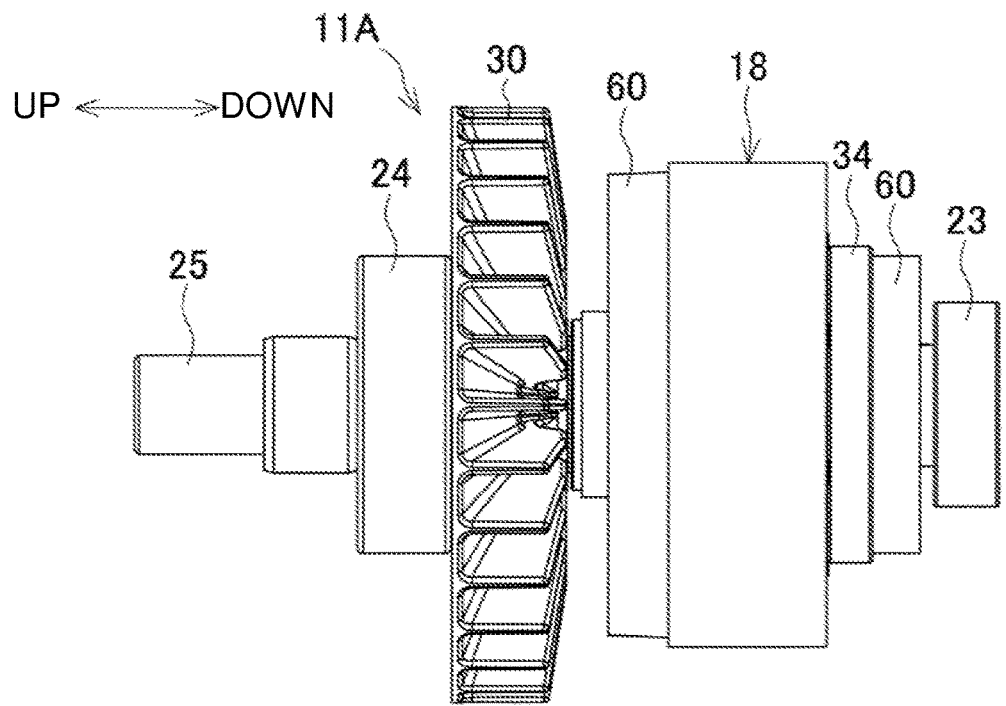
FIG. 4A is a side view of a rotor according to a first modification.
Figure 4B:
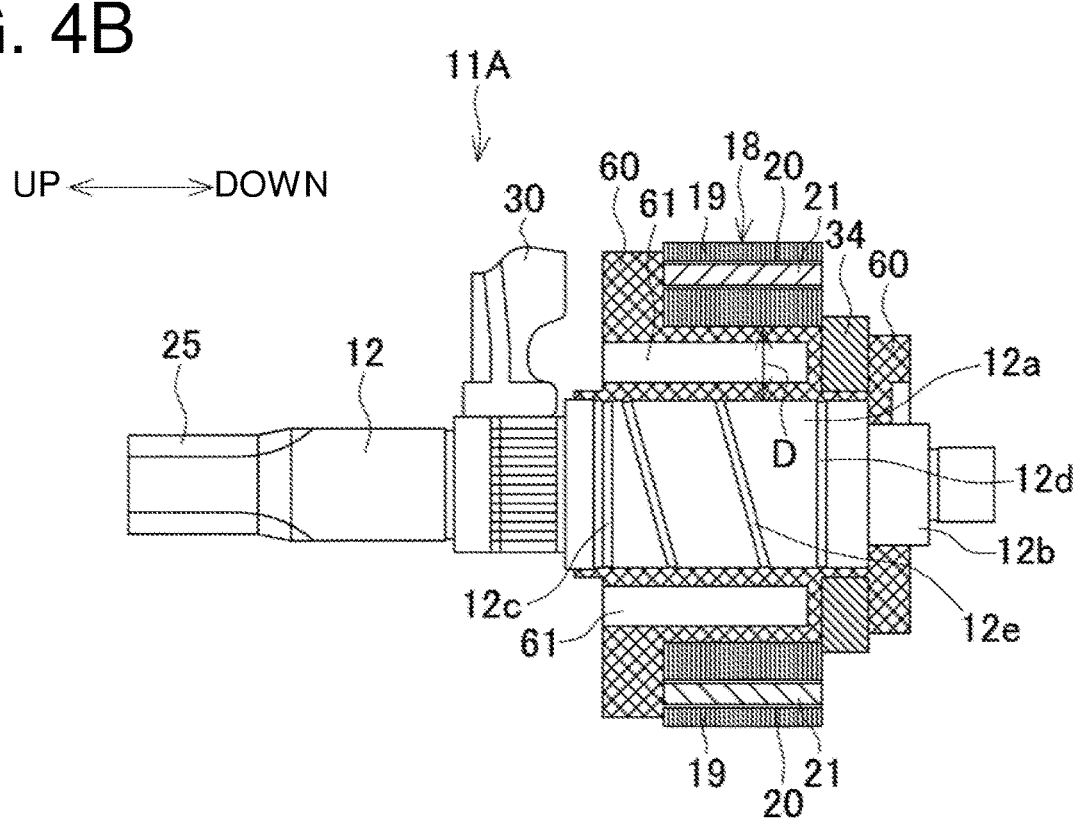
FIG. 4B is a longitudinal sectional view of the rotor according to the first modification.

In the present embodiment, the rotor 11 includes the upper and lower sleeves 32 and 34. In a first modification shown in FIGS. 4A and 4B, a rotor 11A eliminates the upper sleeve. In this structure, the rotational shaft 12, the rotor core 18, and the permanent magnets 21 are connected together using an intermediate member (e.g., a resin) 60 having a smaller specific gravity than iron. The intermediate member 60 and/or the rotor core 18 may have lightening holes (third spaces) 61.

When the intermediate member 60 is not a resin, the radial distance D between the rotational shaft 12 and the rotor core 18 may be greater than or equal to 1 mm (or may specifically be 1.5 mm) to achieve insulation.

In the present modification, the intermediate member 60, which has a smaller specific gravity than iron, is used between the rotational shaft 12 and the rotor core 18 to reduce the weight of the rotor 11. The intermediate member 60 can have lightening holes (spaces) 61 to further reduce weight. Additionally, the structure allows a large space between the rotational shaft 12 and the rotor core 18. This eliminates the need for rotor cores 18 with different inner diameters to fit the outer diameter of the rotational shaft 12.

Figure 5:
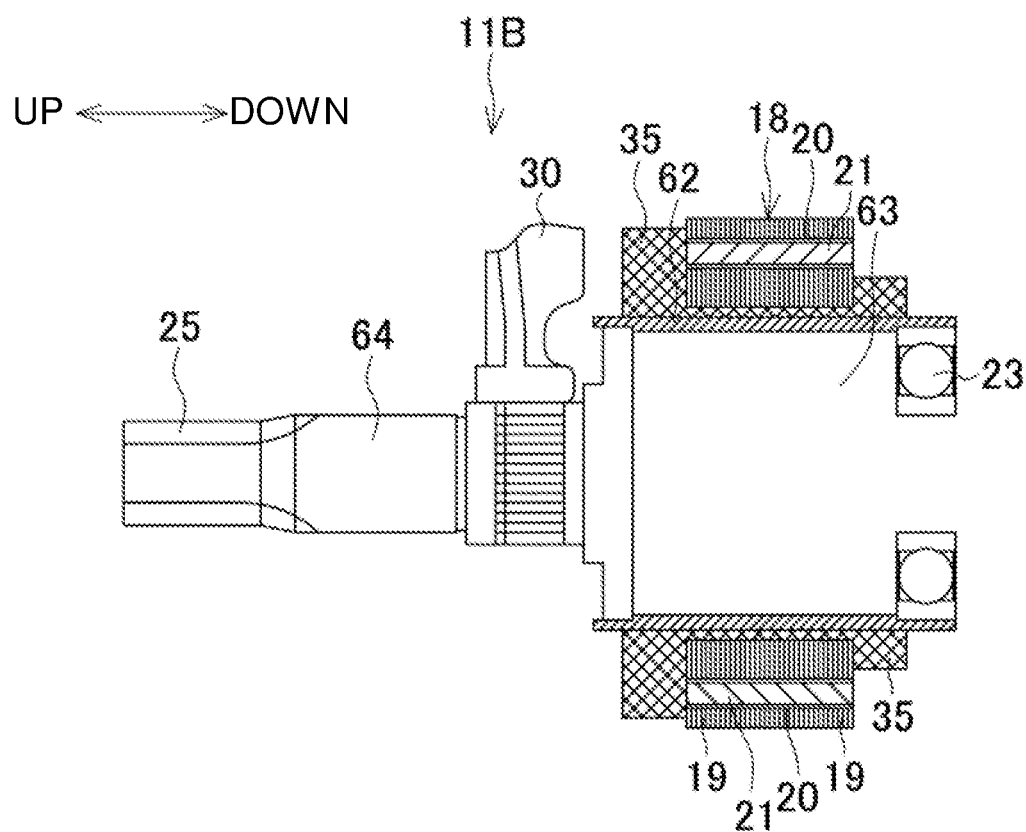
FIG. 5 is a longitudinal sectional view of a rotor according to a second modification.

A rotor 11B according to a second modification shown in FIG. 5 includes a hollow rotational shaft 62 with an internal space 63. The rotational shaft 62 has one end into which a separate pinion shaft 64 is press-fit, and the other end into which a bearing 23 is press-fit. The bearing 23 is supported by a support shaft protruding from the bottom of the motor housing 2.

After the rotational shaft 62, the rotor core 18, and the permanent magnets 21 are integrated together with the resin 35, the pinion shaft 64 is press-fit in the rotational shaft 62 with the rotor core 18 being fixed. When the integrated rotor core 18 and rotational shaft 62 have different axes, the inner surface of the rotational shaft 62 is machined to align the axes before the pinion shaft 64 is press-fit.

The rotor 11B according to the present modification also has the space (second space) 63 defined in the rotational shaft 62 to reduce weight.

The rotor 11 excluding the pinion shaft 64 can be common to different products. Preparing pinion shafts 64 with different lengths or including different numbers of teeth allows different products to use the same rotor manufacturing processes except the gear mounting processes. This reduces costs.

The inner surface of the rotational shaft 62 can be machined to adjust coaxiality. This reduces eccentricity and reduces iron loss resulting from such eccentricity, and thus improves a balance and eliminates any balancing member, such as the upper and lower sleeves.

The rotational shaft 62 having a smaller diameter allows a radially large space between the rotational shaft 62 and the rotor core 18. This eliminates the need for rotor cores 18 with different inner diameters to fit the outer diameter of the rotational shaft 62.

The position and the orientation of the brushless motor are not limited to those described in the above embodiment. The brushless motor may point forward, be tilted, or extend laterally. The brushless motor may be replaced with another motor.

The rotor with reduced weight is usable in a power tool that may not be a hammer drill, but may be an impact drill or a circular saw.

REFERENCE SIGNS LIST 1 hammer drill
2 motor housing
3 brushless motor
4 output housing
5 output unit
6 battery mount
7 controller
8 battery pack
10 stator
11, 11A, 11B rotor
12, 62 rotational shaft
13 stator core
14 upper insulator
15 lower insulator
16 coil
17 sensor circuit board
18 rotor core
19, 19a electromagnetic steel plate
20 through-hole
21 permanent magnet
23, 24 bearing
32 upper sleeve
34 lower sleeve
35 resin
36, 61 lightening hole
40 tool holder
60 intermediate member
63 space
64 pinion shaft
S1 cylindrical space S2, S3, S5 disk-shaped space
S4 clearance

What is claimed is:

1. A power tool comprising:
a motor including
a stator, and
a rotor rotatable relative to the stator, the rotor including
a rotor core having a through-hole and a first space, the first space located inward from the through-hole, and
a permanent magnet fitted in the through-hole, wherein:
the rotor core includes:
a plurality of first electromagnetic steel plates, each of the first electromagnetic steel plates having a first hole and a second hole located outward from the first hole in a radial direction: and
a second electromagnetic steel plate:
the first space is defined by the first hole of the plurality of first electromagnetic steel plates;
the first space is closed by the second electromagnetic steel plate; and
the rotor core includes a swaged part located between the first space and the through-hole.

2. The power tool according to claim 1, further comprising:
a resin integrally fixing the rotor core and the permanent magnet,
wherein the first space is closed.

3. The power tool according to claim 2, wherein
the first space has two ends closed by a plurality of the second electromagnetic steel plate in an axial direction of the rotor core.

4. The power tool according to claim 2, wherein
the rotor further includes a rotational shaft having a second space, and
the resin integrally fixing the rotational shaft, the rotor core, and the permanent magnet.

5. The power tool according to claim 3, wherein
the rotor further includes a rotational shaft having a second space, and
the resin integrally fixing the rotational shaft, the rotor core, and the permanent magnet.

6. The power tool according to claim 1, wherein
the rotor further includes
a rotational shaft having a second space, and
an intermediate member having a smaller specific gravity than iron between the rotational shaft and the rotor core.

7. The power tool according to claim 6, wherein
the intermediate member has a third space.

8. A power tool comprising:
a motor including
a stator, and
a rotor rotatable relative to the stator, the rotor including
a rotor core having a through-hole and a first space, the first space located inward from the through-hole, and
a permanent magnet fitted in the through-hole, wherein
the rotor core includes a swaged part located between the first space and the through-hole.

9. The power tool according to claim 1, wherein
the rotor includes
a rotational shaft located inward from the rotor core, and
a sleeve, and
the power tool further comprising
a resin integrally fixing the rotor core, the rotational shaft, and the sleeve.

10. The power tool according to claim 9, wherein
the swaged part and the first space are located outward from the sleeve in the radial direction.

11. The power tool according to claim 10, wherein
the sleeve includes a short cylindrical part.

* * * * *